US012767857B2

(12) United States Patent
Takahashi et al.

(10) Patent No.: US 12,767,857 B2
(45) Date of Patent: Oct. 20, 2026

(54) CURABLE COMPOSITION, ARTICLE, CHECKING METHOD, AND ADHESIVE COMPOSITION

(71) Applicant: DENKA COMPANY LIMITED, Tokyo (JP)

(72) Inventors: Yusuke Takahashi, Tokyo (JP); Chiaki Takano, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 794 days.

(21) Appl. No.: 18/034,624

(22) PCT Filed: Oct. 27, 2021

(86) PCT No.: PCT/JP2021/039616

§ 371 (c)(1),
(2) Date: Apr. 28, 2023

(87) PCT Pub. No.: WO2022/092140

PCT Pub. Date: May 5, 2022

(65) Prior Publication Data

US 2023/0416578 A1 Dec. 28, 2023

(30) Foreign Application Priority Data

Oct. 29, 2020 (JP) ................................ 2020-181256

(51) Int. Cl.

| | |
|---|---|
| ***C09J 4/06*** | (2006.01) |
| ***C08F 220/14*** | (2006.01) |
| ***C08F 290/04*** | (2006.01) |
| ***C08F 290/06*** | (2006.01) |
| ***C08G 18/67*** | (2006.01) |
| ***C08G 18/69*** | (2006.01) |
| ***C09D 4/06*** | (2006.01) |
| ***C09J 5/06*** | (2006.01) |
| ***C09J 175/16*** | (2006.01) |
| ***C09K 11/02*** | (2006.01) |
| ***G01N 21/64*** | (2006.01) |

(52) U.S. Cl.

CPC ............... *C09J 4/06* (2013.01); *C08F 220/14* (2013.01); *C08F 290/048* (2013.01); *C08F 290/067* (2013.01); *C08G 18/672* (2013.01); *C08G 18/69* (2013.01); *C09D 4/06* (2013.01); *C09J 5/06* (2013.01); *C09J 175/16* (2013.01); *C09K 11/02* (2013.01); *G01N 21/6428* (2013.01); *C09J 2400/166* (2013.01); *G01N 2021/6439* (2013.01)

(58) Field of Classification Search

CPC .... C08F 220/12; C08F 220/14; C08F 220/20; C08F 290/048; C08F 290/067; C09J 4/06; C08G 18/69; C08G 18/672

See application file for complete search history.

(56) References Cited

U.S. PATENT DOCUMENTS

| | | | | |
|---|---|---|---|---|
| 4,331,795 | A | 5/1982 | Ukita et al. | |
| 7,829,605 | B2 | 11/2010 | Watanabe et al. | |
| 8,313,799 | B2 | 11/2012 | Lauria et al. | |
| 8,398,889 | B2 | 3/2013 | Kupsky et al. | |
| 2009/0030107 | A1 | 1/2009 | Watanabe et al. | |
| 2010/0032625 | A1 | 2/2010 | Kupsky et al. | |
| 2010/0304008 | A1 | 12/2010 | Lauria et al. | |
| 2014/0131306 | A1* | 5/2014 | Wang | C09J 113/00 522/18 |
| 2017/0253762 | A1* | 9/2017 | Sato | C09D 109/00 |
| 2018/0022835 | A1* | 1/2018 | Motoda | C09D 4/06 524/525 |
| 2020/0377628 | A1* | 12/2020 | Polidore | C08F 2/50 |

FOREIGN PATENT DOCUMENTS

| | | | |
|---|---|---|---|
| CN | 105062375 | A | 11/2015 |
| JP | S56-16561 | A | 2/1981 |
| JP | H05-331438 | A | 12/1993 |
| JP | H07-232424 | A | 9/1995 |
| JP | 2006-160861 | A | 6/2006 |
| JP | 2007-077321 | A | 3/2007 |
| JP | 2009-530464 | A | 8/2009 |
| JP | 2010-530060 | A | 9/2010 |
| JP | 2012-144641 | A | 8/2012 |
| JP | 6297405 | B2 | 3/2018 |
| WO | 2012/141299 | A1 | 10/2012 |
| WO | 2014/024826 | A1 | 2/2014 |

OTHER PUBLICATIONS

Mar. 21, 2024 Extended Search Report issued in European Patent Application No. 21886258.9.

Dec. 27, 2024 Office Action issued in Chinese Patent Application No. 202180069561.5.

Jan. 18, 2022 International Search Report issued in International Patent Application No. PCT/JP2021/039616.

Cheng et al., Synthesis and Application of Fine Chemical Products (The 3rd Edition), Dalian University of Technology Press (Aug. 31, 2002), p. 69-70.

* cited by examiner

*Primary Examiner* — Marc S Zimmer

(74) *Attorney, Agent, or Firm* — Oliff PLC

(57) ABSTRACT

A curable composition containing a polymerizable compound (A) and a polymerization initiator (B). A half width of a temperature-loss tangent (tan δ) graph is 90° C. or higher and 150° C. or lower, where the half width is obtained by measuring a dynamic viscoelasticity of a cured substance of this curable composition under measurement conditions of frequency: 1.0 Hz, mode: tensile mode, measurement temperature range: −50° C. to 200° C., and temperature rising rate: 2° C./min.

14 Claims, 1 Drawing Sheet

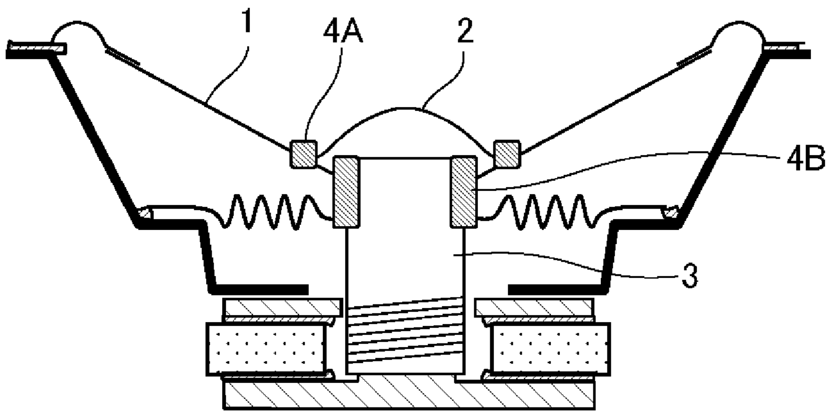
1
4A
2
4B
3

CURABLE COMPOSITION, ARTICLE, CHECKING METHOD, AND ADHESIVE COMPOSITION

TECHNICAL FIELD

The present invention relates to a curable composition, an article, a checking method, and an adhesive composition.

BACKGROUND ART

Various developments have so far been made on curable compositions such as adhesives due to the industrial importance thereof.

Patent Document 1 describes that a (meth)acrylate-based curable composition containing the following (1) to (4) is used as an adhesive.

(1) A (meth)acrylic acid derivative monomer containing the following (1-1) to (1-4)

(1-1) A monofunctional (meth)acrylate having a saturated hydrocarbon having 1 to 7 carbon atoms through an ester bond (1-2) A monofunctional (meth)acrylate having a saturated alicyclic hydrocarbon group having 9 to 12 carbon atoms through an ester bond (1-3) A hydroxyl group-containing (meth)acrylate (1-4) A polyfunctional (meth)acrylate (2) A polymerization initiator (3) A reducing agent (4) A fluorescent agent In Examples of Patent Document 1, it is described that a test piece obtained by bonding cold-rolled steel plates (SPCC) to each other using the above composition exhibits a large tensile shear adhesion strength.

In paragraph 0031 of Patent Document 2, an adhesive, which contains a specific resin emulsion, a UV light absorbing agent, an antifoaming agent, and/or preservative, is described.

In Patent Document 3, a pressure sensitive adhesive, which contains at least one kind of electroluminescent additive, is described.

RELATED DOCUMENT

Patent Document

[Patent Document 1] Japanese Patent No. 6297405

[Patent Document 2] PCT Japanese Translation Patent Publication No. 2010-530060

[Patent Document 3] PCT Japanese Translation Patent Publication No. 2009-530464

SUMMARY OF THE INVENTION

Technical Problem

Patent Document 1 describes that a (meth)acrylate-based curable composition is preferably used for adhesion between metals.

On the other hand, industrially, not only the adhesion of a metal but also the strong adhesion of a porous material such as paper is sometimes required. As an example, in speaker manufacturing, it is sometimes required to adhere a paper member (cone paper, dust cap paper, or the like) within a speaker.

The inventors of the present invention found that there is room for improvement from the viewpoint of adhesiveness such as adhesion strength in a case where the composition is applied to the adhesiveness of a porous material.

The present invention has been made in consideration of such circumstances. One of the objects of the present invention is to provide a curable composition capable of strongly adhering a porous material such as paper.

Solution to Problem

The inventors of the present invention have completed the present invention provided below and solved the problem described above.

According to the present invention, the following curable composition is provided.

A curable composition including:

a polymerizable compound (A); and a polymerization initiator (B), in which a half width of a temperature-loss tangent (tan δ) graph, which is obtained by measuring a dynamic viscoelasticity of a cured substance of the curable composition under the following measurement conditions, is 90° C. or higher and 150° C. or lower,

[measurement conditions]

Frequency: 1.0 Hz

Mode: tensile mode

Measurement temperature range: −50° C. to 200° C.

Temperature rising rate: 2° C./min.

In addition, according to the present invention, there is provided an article containing a cured substance of the curable composition.

In addition, according to the present invention, there is provided a checking method for checking a state of being coated with a curable composition by irradiating, with ultraviolet rays, an adherend that is coated with the curable composition (further containing a fluorescent agent (C)) described above.

Advantageous Effects of Invention

In a case of using the curable composition according to the present invention, it is possible to strongly adhere a porous material such as paper.

BRIEF DESCRIPTION OF THE DRAWINGS

FIG. 1 is a view (a cross-sectional view) schematically illustrating a configuration example of a speaker.

DESCRIPTION OF EMBODIMENTS

Hereinafter, embodiments according to the present invention will be described in detail while referring to drawings.

The drawings are for explanatory purposes only. A shape or a dimensional ratio of each member in the drawing does not necessarily correspond to an actual article.

In the present specification, the description "X to Y" in the description of a numerical range represents X or more and Y or less unless specified otherwise. For example, "1% to 5% by mass" means "1% by mass or more and 5% by mass or less".

In the present specification, the description "group (atomic group)" includes both a group not having a substituent and a group having a substituent unless specified that the group is substituted or unsubstituted. For example, "alkyl group" includes not only an alkyl group not having a substituent (an unsubstituted alkyl group) but also an alkyl group having a substituent (a substituted alkyl group).

The description "(meth)acryl" in the present specification represents a concept including both acryl and methacryl. The same applies to the similar description such as "(meth) acrylate".

<Curable Composition>

The composition according to the present embodiment is preferably used as an adhesive composition. Hereinafter, the curable composition may be referred to as an adhesive composition.

The curable composition according to the present embodiment contains a polymerizable compound (A) and a polymerization initiator (B).

A half width of a temperature-loss tangent (tan δ) graph, which is obtained by measuring a dynamic viscoelasticity of a cured substance of the curable composition according to the present embodiment under the following measurement conditions, is 90° C. or higher and 150° C. or lower.

[Measurement conditions]

Frequency: 1.0 Hz

Mode: tensile mode

Measurement temperature range: −50° C. to 200° C.

Temperature rising rate: 2° C./min

The inventors of the present invention studied every index as a design index of a curable composition for strongly adhering a porous material such as paper. Through the studies, the inventors of the present invention found that the loss tangent (tan δ) obtained by measuring a dynamic viscoelasticity of a cured substance of the curable composition seems to be related to the adhesiveness of the porous material.

The inventors of the present invention proceeded further studies based on this finding. Then, it was found that the magnitude of the half width of the tan δ graph obtained by the dynamic viscoelasticity measurement under the above conditions correlates with the adhesiveness of the porous material. Based on this finding, the inventors of the present invention newly designed a curable composition, which is a curable composition containing a polymerizable compound (A) and a polymerization initiator (B), where the half width of the temperature-loss tangent (tan δ) graph of the cured substance is 90° C. or higher. Then, the adhesiveness of the porous material could be improved.

This half width is preferably 95° C. or higher and more preferably 100° C. or higher.

It is noted that although the larger the half width, the better, the upper limit of the half width is set to 150° C. in the present embodiment from the viewpoint of practical composition design. The upper limit of the half width is preferably 130° C. and more preferably 120° C.

The reason why the half width of the temperature-loss tangent (tan δ) graph of the cured substance correlates with the adhesiveness of the porous material is not necessarily clear. However, this can be explained as follows.

A porous material such as paper has various large or small pores and gaps. In order to improve the adhesiveness of the porous material, it is conceived to be important that these various large or small pores and gaps interact with the cured substance of the curable composition.

Roughly speaking, tan δ is an index that indicates the "tenacity" of an object to be measured. In a case where the half width of the tan δ graph is large, it is conceived that the cured substance of the curable composition according to the present embodiment has various "tenacity" and thus easily interacts with small pores and gaps, large pores and gaps, or both large or small pores and gaps in a porous material. It is conceived that this is related to the fact that the porous material can be strongly adhered.

It should be noted that in the present embodiment, the half width means the full width at half maximum. That is, the half width is $t_2$-$t_1$ in a case where tan δ exhibits a maximum value x at a temperature T and in a case where a temperature at which tan δ is x/2 on a side of a temperature lower than the temperature T is denoted as $t_1$, and a temperature at which tan δ is x/2 on a side of a temperature higher than the temperature T is denoted as $t_2$.

A curable composition, in which the half width of the temperature-loss tangent (tan δ) graph is 90° C. or higher and 150° C. or less, can be produced by using an appropriate amount of a suitable material and selecting a suitable production method. Preferably, a curable composition in which the half width is 90° C. or higher and 150° C. or lower can be obtained by using a relatively large amount of a compound having a diene-based skeleton described below as a material.

Hereinafter, the constitutional components of the curable composition according to the present embodiment, and the properties, physical properties, and the like of the curable composition will be specifically described.

(Polymerizable Compound (A))

The curable composition according to the present embodiment contains a polymerizable compound (A).

The polymerizable compound (A) preferably includes a compound having a (meth)acryloyl group. The compound having a (meth)acryloyl group can include the following (a1), (a2), (a3), and (a4). These are described below.

Compound (a1) having (meth)acryloyl group and having diene-based or hydrogenated diene-based skeleton The curable composition according to the present embodiment preferably includes a compound (a1) having a (meth) acryloyl group and having a diene-based or hydrogenated diene-based skeleton.

The main chain skeleton of the compound (a1) is a diene-based or hydrogenated diene-based skeleton. The diene-based or hydrogenated diene-based skeleton is preferably one or more skeletons selected from the group consisting of polybutadiene, polyisoprene, a hydrogenated product of polybutadiene, and a hydrogenated product of polyisoprene. Among these, one or more selected from the group consisting of polybutadiene and polyisoprene is preferable, and polybutadiene is more preferable, from the viewpoint that adhesion durability is high.

The compound (a1) preferably has one or more (meth) acryloyl groups at the terminal or the side chain of the main chain skeleton. Among these, the one having (meth)acryloyl groups at terminals of the main chain skeleton is preferable.

The compound (a1) is preferably urethane (meth)acrylate.

The urethane (meth)acrylate refers to urethane (meth) acrylate having a urethane bond in the molecule, which is obtained subjecting a polyol compound (hereinafter, represented by X), an organic polyisocyanate compound (hereinafter, represented by Y), and a hydroxyl group-containing (meth)acrylate (hereinafter, represented by Z), to a reaction (for example, a polycondensation reaction).

The polyol compound (X) is preferably a polydiene-based polyol from the viewpoint that the main chain skeleton has a diene-based or hydrogenated diene-based skeleton. Examples of the polydiene-based polyols include a polybutadiene polyol, a polyisoprene polyol, and a hydrogenated conjugated diene polyol (a hydrogenated polybutadiene polyol, a hydrogenated polyisoprene polyol, or the like). Among the polydiene-based polyols, one or more of the group consisting of a polybutadiene polyol and a hydrogenated conjugated diene polyol are preferable, and a polybutadiene polyol is more preferable.

As the organic polyisocyanate compound (Y), polyisocyanates such as an aromatic polyisocyanate, an aliphatic polyisocyanate, a cycloaliphatic polyisocyanate, and an alicyclic polyisocyanate can be used. Among these, an aromatic polyisocyanate is preferable. Among the aromatic polyisocyanates, tolylene diisocyanate (TDI) is preferable.

The hydroxyl group-containing (meth)acrylate (Z) refers to a (meth)acrylate having a hydroxyl group. Among the hydroxyl group-containing (meth)acrylates (Z), a hydroxyalkyl (meth)acrylates is preferable.

Examples of the hydroxyalkyl (meth)acrylate include a (meth)acrylic monomer represented by General Formula (E).

$$Z—O—(R_7O)_s—H \quad \text{General Formula (E)}$$

(In the formula, Z represents a (meth)acryloyl group, $R_7$ represents $—C_2H_4—$, $—C_3H_6—$, $—CH_2CH(CH_3)—$, $—C_4H_8—$, or $—C_6H_{12}—$, and s represents an integer of 1 to 10.)

Among the hydroxyalkyl(meth)acrylates, one or more of the group consisting of 2-hydroxyethyl (meth)acrylate, 3-hydroxypropyl (meth)acrylate, and 4-hydroxybutyl(meth) acrylate is preferable, and 2-hydroxyethyl (meth)acrylate is more preferable.

Examples of the urethane (meth)acrylate include 1,2-polybutadiene dimethacrylate (for example, "TE-2000" manufactured by NIPPON SODA Co., Ltd.) and hydrogenated 1,2-polybutadiene diacrylate (for example, "TEAI-1000" manufactured by NIPPON SODA Co., Ltd.).

The structure of "TE-2000" manufactured by NIPPON SODA Co., Ltd. is as follows. The polyol compound is a 1,2-polybutadiene polyol, which is a polybutadiene polyol. The organic polyisocyanate compound is tolylene diisocyanate. Hydroxy (meth)acrylate is 2-hydroxyethyl methacrylate.

The structure of "TEAI-1000" manufactured by NIPPON SODA Co., Ltd. is as follows. The polyol compound is a hydrogenated 1,2-polybutadiene polyol, which is a polybutadiene polyol. The organic polyisocyanate compound is tolylene diisocyanate. Hydroxy (meth)acrylate is 2-hydroxyethyl acrylate.

In a case where the main chain skeleton of the compound (a1) is polyisoprene, it is preferably an esterified product oligomer between a maleic acid anhydride adduct of an isoprene polymerized substance and 2-hydroxyethyl (meth) acrylate. The structure of the esterified product oligomer between a maleic acid anhydride adduct of an isoprene polymerized substance and 2-hydroxyethyl (meth)acrylate is represented by Formula (1).

The molecular weight of the compound represented by Formula (1) is preferably 3,000 to 50,000.

In Formula (1), Y is preferably an alkylene group having 1 to 5 carbon atoms and more preferably an ethylene group. m is preferably 100 to 1,500. n is preferably 1 to 20.

Examples of the esterified product oligomer between a maleic acid anhydride adduct of an isoprene polymerized substance and 2-hydroxyethyl (meth)acrylate include "UC-102M" manufactured by KURARAY Co., Ltd. The structure of "UC-102M" manufactured by KURARAY Co., Ltd. is as follows. In Formula (1), Y is an ethylene group, and R is a methyl group.

The compound (a1) is preferably an oligomer (a1). The number average molecular weight of the oligomer (a1) is preferably from 500 to 70,000, more preferably 1,000 to 60,000, and still more preferably from 1,000 to 55,000. In a case where the number average molecular weight thereof is within this range, it is easy to form an adhesive layer, or workability during adhesion is improved.

As the number average molecular weight, a number average molecular weight in terms of polystyrene, which is measured according to gel permeation chromatography (GPC), can be employed. Specifically, the number average molecular weight can be determined by using a GPC system (SC-8010 manufactured by Tosoh Corporation) under the following conditions, using tetrahydrofuran as a solvent, and creating a calibration curve with commercially available standard polystyrene.

[Conditions]

Flow rate: 1.0 ml/min

Set temperature: 40° C.

Column configuration: Total of three columns (number of theoretical plates in total: 32,000 plates) of one column of "TSKguardcolumn MP (xL)", 6.0 mm ID×4.0 cm, manufactured by Tosoh Corporation, and two columns of "TSK-GELMULTIPOREHXL-M", 7.8 mm ID×30.0 cm, (number of theoretical plates: 16,000 plates), manufactured by Tosoh Corporation Sample injection volume: 100 μl (sample solution concentration: 1 mg/ml)

Liquid feeding pressure: 39 kg/cm$^2$

Detector: RI detector

Examples of the compound (a1) include a compound of an esterified product between a maleic acid anhydride adduct of an isoprene polymerized substance and 2-hydroxyethyl (meth)acrylate ("UC-203" manufactured by KURARAY Co., Ltd., or the like), "TEAI-1000" manufactured by NIPPON SODA Co., Ltd. (a hydrogenated 1,2-polybutadiene compound subjected to terminal acrylic modification), and "TE-2000" manufactured by NIPPON SODA Co., Ltd. (a 1,2-polybutadiene compound subjected to terminal acrylic modification).

[chem. 1]

Formula (1)

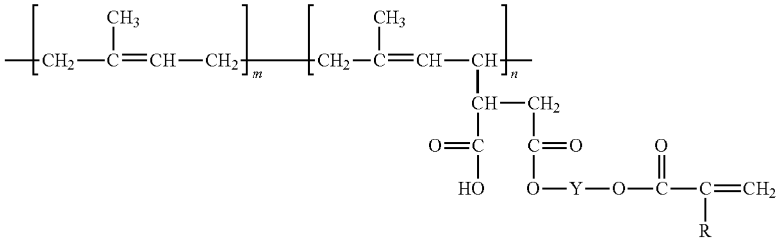

In Formula (1),

R represents a hydrogen atom or a methyl group,

Y represents an alkylene group, and m and n are each independently any positive integer.

In the compound represented by Formula (1), the number of (meth)acryloyl groups in the side chain is preferably 1 to 10.

In a case where the polymerizable compound (A) includes a compound (a1), it may include only one compound (a1) or may include two or more compounds (a1).

In a case where the polymerizable compound (A) includes the compound (a1), the content ratio of the compound (a1) in the entire polymerizable compound (A) is preferably 40% by mass or more and 90% by mass or less, more preferably 50% by mass or more and 80% by mass or less, and still more preferably 55% by mass or more and 80% by mass or less. In a case where the content ratio of the compound (a1) in the entire polymerizable compound (A) is sufficiently large, it is easy to design the half width of the temperature-loss tangent (tan δ) graph to be 90° C. or higher and 150° C. or less, and as a result, it is easy to increase the adhesiveness of the porous material.

Monofunctional (meth)acrylate (a2)

The curable composition according to the present embodiment preferably contains a monofunctional (meth)acrylate (a2) as a component different from the compound (a1).

The monofunctional (meth)acrylate (a2) preferably contains a monofunctional (meth)acrylate having a saturated hydrocarbon group (such as an alkyl group or a cycloalkyl group) having 1 to 7 carbon atoms.

Examples of the monofunctional (meth)acrylates (a2) include methyl (meth)acrylate, ethyl (meth)acrylate, n-butyl (meth)acrylate, isobutyl (meth)acrylate, cyclohexyl (meth) acrylate, n-pentyl (meth)acrylate, and n-heptyl (meth)acrylate. Among these, a monofunctional (meth)acrylate having a saturated hydrocarbon group having 1 to 4 carbon atoms is preferable, and methyl(meth)acrylate is more preferable.

In a case where the polymerizable compound (A) contains a monofunctional (meth)acrylate (a2), it may contain only one monofunctional (meth)acrylate (a2) or may contain two or more monofunctional (meth)acrylates (a2).

In a case where the polymerizable compound (A) contains the monofunctional (meth)acrylate (a2), the content ratio of the monofunctional (meth)acrylate (a2) in the entire polymerizable compound (A) is preferably 3% by mass or more and 20% by mass or less, more preferably 3% by mass or more and 15% by mass or less, and still more preferably 3% by mass or more and 10% by mass or less.

Polyfunctional (meth)acrylate (a3)

The curable composition according to the present embodiment preferably contains a polyfunctional (meth)acrylate (a3) as a component different from the compound (a1).

Examples of the polyfunctional (meth)acrylate include polyfunctional (meth)acrylates having an alicyclic structure, such as dimethylol-tricyclodecane di(meth)acrylate and dimethylol-cyclohexane di(meth)acrylate, polyfunctional (meth)acrylates having an aromatic ring structure, such as ethylene oxide-added bisphenol A di(meth)acrylate, ethylene oxide-added bisphenol F di(meth)acrylate, propylene oxide-added bisphenol A di(meth)acrylate, and propylene oxide-added bisphenol F di(meth)acrylates, and polyfunctional (meth)acrylates having an aliphatic branched structure, such as trimethylolpropane tri(meth)acrylate. Among these, a polyfunctional (meth)acrylate having an aliphatic branched structure is preferable, and trimethylolpropane tri(meth)acrylate is more preferable.

In a case where the polymerizable compound (A) contains a polyfunctional (meth)acrylate (a3), it may contain only one polyfunctional (meth)acrylate (a3) or may contain two or more polyfunctional (meth)acrylates (a3).

In a case where the polymerizable compound (A) contains the polyfunctional (meth)acrylate (a3), the content ratio of the polyfunctional (meth)acrylate (a3) in the entire polymerizable compound (A) is preferably 3% by mass or more and 20% by mass or less, more preferably 3% by mass or more and 15% by mass or less, and still more preferably 3% by mass or more and 10% by mass or less.

Hydroxyl group-containing (meth)acrylate (a4)

The curable composition according to the present embodiment preferably contains a hydroxyl group-containing (meth)acrylate (a4) as a component different from the compound (a1). It is noted that in the present specification, the monofunctional or polyfunctional (meth)acrylate having a hydroxyl group is classified as (a4) rather than (a2) or (a3) described above.

Examples of the hydroxyl group-containing (meth)acrylates include 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 2-hydroxy-3-phenoxypropyl (meth)acrylate, 2-(meth)acryloyloxyethyl-2-hydroxypropyl phthalate, glycerol mono (meth)acrylate, 1,6-hexanediol mono(meth)acrylate, neopentyl glycol mono(meth)acrylate, 4-hydroxycyclohexyl (meth)acrylate, and 1,4-butanediol mono(meth)acrylate. Among these, a hydroxyl group-containing monofunctional (meth)acrylate is preferable. Among the hydroxyl group-containing monofunctional (meth)acrylates, a hydroxyalkyl (meth)acrylate is preferable.

Examples of the hydroxyalkyl (meth)acrylate include a (meth)acrylic monomer represented by General Formula (E).

$$Z—O—(R_7O)_s—H \quad \text{General Formula (E)}$$

(In the formula, Z represents a (meth)acryloyl group, $R_7$ represents $—C_2H_4—$, $—C_3H_6—$, $—CH_2CH(CH_3)—$, $—C_4H_8—$, or $—C_6H_{12}—$, and s represents an integer of 1 to 10.)

Among the hydroxyalkyl(meth)acrylates, one or more of the group consisting of 2-hydroxyethyl (meth)acrylate, 3-hydroxypropyl (meth)acrylate, and 4-hydroxybutyl (meth) acrylate is preferable, and 2-hydroxyethyl (meth)acrylate is more preferable.

In a case where the polymerizable compound (A) contains a hydroxyl group-containing (meth)acrylate (a4), it may contain only one hydroxyl group-containing (meth)acrylate (a4) or may contain two or more hydroxyl group-containing (meth)acrylates (a4).

In a case where the polymerizable compound (A) contains the hydroxyl group-containing (meth)acrylate (a4), the content ratio of the hydroxyl group-containing (meth)acrylate (a4) in the entire polymerizable compound (A) is preferably 10% by mass or more and 50% by mass or less, more preferably 15% by mass or more and 45% by mass or less, and still more preferably 20% by mass or more and 40% by mass or less.

(Polymerization Initiator (B))

The curable composition according to the present embodiment contains a polymerization initiator (B).

The polymerization initiator (B) is not particularly limited as long as it can polymerize the polymerizable compound (A).

Preferred examples of the polymerization initiator (B) include an organic peroxide. Examples of the organic peroxide include cumene hydroperoxide, para-methane hydroperoxide, tertiary butyl hydroperoxide, diisopropyl benzene dihydroperoxide, methyl ethyl ketone peroxide, and tertiary butyl peroxybenzoate. Among these, cumene hydroperoxide is preferable in terms of stability.

It is noted that in a case of using, in combination, the polymerization initiator (B) and a reducing agent (D) described below, the curability can be further enhanced.

The amount of the polymerization initiator (B) is preferably 0.1 to 20 parts by mass and more preferably 0.4 to 10 parts by mass with respect to 100 parts by mass of the polymerizable compound (A). In a case of using a suitably large amount of the polymerization initiator (B), the curing speed can be sufficiently increased. On the other hand, in a case of using the polymerization initiator (B) so that the amount thereof is not too large, it is possible to obtain sufficient storage stability.

(Fluorescent Agent (C))

The curable composition according to the present embodiment preferably contains a fluorescent agent (C). In a case where the curable composition contains the fluorescent agent (C), it is easy to check a state of coating of an adherend with a curable composition.

Examples of the fluorescent agent (C) include a compound that emits light in a case of being irradiated with ultraviolet rays. Examples of the fluorescent agent (C) include a coumarin derivative, an oxazole derivative, a stilbene derivative, an imidazole derivative, a triazole derivative, and rhodamine. Examples of the commercially available fluorescent agent include Kayalight series (manufactured by Nippon Kayaku Co., Ltd.), Hakkol series (manufactured by Showa Chemical Industry Co., Ltd.), and Rhodamine B (manufactured by FUJIFILM Wako Pure Chemical Corporation). The fluorescent agent (C) is preferably a fluorescent agent that does not react with other components in the curable composition. In particular, a coumarin derivative and/or an oxazole derivative is preferable. Examples of the coumarin derivative include the trade name “Hakkol P” (manufactured by Showa Chemical Industry Co., Ltd.).

In a case where the curable composition according to the present embodiment contains the fluorescent agent (C), it may contain only one fluorescent agent (C) or may contain two or more fluorescent agents (C).

In a case where the curable composition according to the present embodiment contains the fluorescent agent (C), the amount thereof is preferably 0.001 to 5 parts by mass, more preferably 0.005 to 1.0 parts by mass, still more preferably 0.01 to 0.5 parts by mass, and particularly preferably 0.05 to 0.3 parts by mass, with respect to 100 parts by mass of the polymerizable compound (A). In a case of using a large amount of the fluorescent agent (C) to some extent, it is sufficiently easy to check a state of coating of an adherend with a curable composition. On the other hand, in a case of using the fluorescent agent (C) so that the amount thereof is not too large, it is possible to obtain the effect of the fluorescent agent (C) while maintaining other properties such as adhesiveness.

(Reducing Agent (D))

The curable composition according to the present embodiment preferably contains a reducing agent (D). Examples of the reducing agent (D) include known reducing agents that react with the polymerization initiator (B) to generate radicals. Examples of the reducing agent (D) include a tertiary amine, a thiourea derivative, and a transition metal salt.

Examples of the tertiary amine include triethylamine, tripropylamine, tributylamine, N,N-dimethyl para-toluidine, and N,N-di(2-hydroxyethyl)-p-toluidine. Among the tertiary amines, N,N-di(2-hydroxyethyl)-p-toluidine is preferable. Examples of the thiourea derivative include 2-mercaptobenzimidazole, methylthiourea, dibutylthiourea, ethylene thiourea, acetyl-2-thiourea, benzoylthiourea, N,N-diphenylthiourea, N,N-diethylthiourea, N,N-dibutylthiourea, and tetramethylthiourea. Among the thiourea derivatives, ethylene thiourea is preferable. Examples of the transition metal salt include cobalt octylate, cobalt naphthenate, copper naphthenate, and vanadyl acetylacetonate. Among the transition metal salts, cobalt octylate is preferable. One or more of these may be used. Among these, a tertiary amine and/or a transition metal salt is preferable, and a combined use of a thiourea derivative and a transition metal salt is more preferable. In a case where a tertiary amine and a transition metal salt are used in combination, the using ratio of the tertiary amine to the transition metal salt in terms of mass ratio is preferably 5 to 45:55 to 95 and more preferably 10 to 30:70 to 90, in a total of 100 parts by mass of the tertiary amine and the transition metal salt.

In a case where the reducing agent (D) is used, the using amount thereof is preferably 0.05 to 15 parts by mass and more preferably 0.1 to 5 parts by mass with respect to 100 parts by mass of the polymerizable compound (A) from the viewpoint of the balance between curing speed improvement and storage stability.

(Paraffin (E))

The curable composition according to the present embodiment may contain a paraffin (E). Specifically, various paraffins can be used to accelerate the curing of a portion exposed to air. Examples of the paraffin (E) include paraffin wax, microcrystalline wax, carnauba wax, beeswax, lanolin, spermaceti, ceresin, and candelilla wax.

In a case where the curable composition according to the present embodiment contains the paraffin (E), it may contain only one paraffin or may contain two or more paraffins.

In a case where the curable composition according to the present embodiment contains the paraffin (E), the amount thereof is preferably 0.01 to 3 parts by mass and more preferably 0.5 to 2 parts by mass with respect to 100 parts by mass of the polymerizable compound (A). In a case of using a large amount of the paraffin (E) to some extent, it is possible to sufficiently obtain the effect of accelerating curing. On the other hand, in a case where the amount of the paraffin (E) is not too large, it is possible to obtain the effect of accelerating curing while obtaining sufficient adhesiveness.

(Other Components)

The curable composition according to the present embodiment may contain or may not contain optional components other than those described above.

For example, thermoplastic polymers such as chlorosulfonated polyethylene, polyurethane, a styrene-acrylonitrile copolymer, and polymethyl methacrylate, as well as fine powder silica and the like may be used for the intended purpose of adjusting viscosity and fluidity.

(Various Characteristics)

Storage elastic modulus E'

In the dynamic viscoelasticity measurement described above, the storage elastic modulus E' at the peak top temperature of the loss tangent (tan δ) is preferably $3\times10^7$ Pa or more, more preferably $4\times10^7$ Pa or more, and still more preferably $5\times10^7$ Pa or more. Although there is no particular upper limit in the storage elastic modulus E', the upper limit thereof is, for example, $5\times10^8$ Pa and specifically $1\times10^8$ Pa from the viewpoint of practical composition design.

It is conceived that a large storage elastic modulus E' at the peak top temperature (corresponding to the glass transition temperature) of the loss tangent indicates that the crosslinked structure is sufficiently developed in the curable composition (the cured substance). That is, in a case where the storage elastic modulus E' is equal to or larger than a certain value, it is conceived that the cured substance becomes stronger, and as a result, the adhesiveness is further improved.

It is noted that the peak top temperature of the loss tangent itself is generally 50° C. to 150° C., preferably 50° C. to 140° C., and more preferably 70° C. to 130° C.

Adhesiveness between porous material and metal

As described above, in a case of using the curable composition according to the present embodiment, it is possible to strongly adhere a porous material such as paper.

The 180° peel strength of a test piece, which is obtained by adhering a cold-rolled steel plate (SPCC) to a canvas having a width of 25 mm at 23° C. using the curable composition according to the present embodiment, is quantitatively, for example, 1 kN/m or more and preferably 2 kN/m or more. Basically, the larger the peel strength is, the better it is, and the upper limit thereof is not particularly limited; however, from the practical viewpoint, the upper limit thereof is, for example, 10 kN/m.

Adhesiveness between metals

In addition, in a case of using the curable composition according to the present embodiment, it is possible to adhere metals sufficiently strongly to each other.

The tensile shear adhesion strength determined according to a tensile shear adhesion test of a test piece obtained by adhering cold-rolled steel plates to each other at 23° C. using the curable composition according to the present embodiment is quantitatively, preferably 10 MPa or more. Basically, the larger the upper limit of the adhesion force is, the better it is, and the upper limit thereof is not particularly limited; however, from the practical viewpoint, the upper limit thereof is, for example, 40 MPa, specifically 30 MPa, and more specifically 20 MPa.

Curing time (time taken until adhesion force is exhibited)

The curable composition according to the present embodiment is preferably cured gradually at room temperature without heating. Specifically, curability can be adjusted by adjusting the kind and amount of the polymerization initiator (B) and the kind and amount of the reducing agent (D).

In a tensile shear adhesion test of a test piece obtained by adhering cold-rolled steel plates to each other at 23° C. using the curable composition according to the present embodiment, the time taken until the strength of 0.1 MPa is exhibited is quantitatively, preferably 2 minutes or more and less than 1 hour, more preferably 2 minutes or more and 30 minutes or less, and still more preferably 2 minutes or more and 20 minutes or less.

In a case where the time taken until the adhesion strength is exhibited is long to some extent, a constant adhesion strength can be obtained even in a case where the time taken from the coating with the curable composition to the adhesion varies. Such properties are preferred properties in a case of adhering a large number of articles in a manner of an assembly-line system. In addition, production efficiency can be improved in a case where the time taken until the adhesion strength is exhibited is not too long.

(One-Agent Type/Two-Agent Type)

The curable composition according to the present embodiment may be a so-called one-agent type or may be a two-agent type (a curable composition of which two agents filled in separate containers are mixedly used immediately before use).

In a case of the two-agent type, it is preferable that the polymerization initiator (B) is contained in the first agent and the reducing agent (D) is contained in the second agent, respectively, so that the polymerization initiator (B) does not come into contact with the reducing agent (D) until just before the use of the curable composition. In addition, a tertiary amine is preferably contained in the first agent, and a thiourea derivative and a transition metal salt are preferably contained in the second agent. The fluorescent agent (C) is preferably mixed with the second agent from the viewpoint of avoiding a reaction with the polymerization initiator (B). Other components can be appropriately mixed with the first agent and/or the second agent. It suffices that the first agent and the second agent are mixed just before use.

It is noted that in a case where the curable composition according to the present embodiment is a two-agent type, it is preferable that the amounts of respective components in the first agent and the second agent are adjusted so that the curable composition after mixing the first agent and the second agent contains the above-described respective components in the ranges of the preferred contents of the components, respectively.

<Use Application to which Article/Curable Composition is Applied>

The curable composition according to the present embodiment can be used as, for example, an adhesive, a coating agent, an injection agent, and a repair agent. In a case of using the curable composition according to the present embodiment, an article containing a cured substance of the curable composition can be manufactured.

Above all, the curable composition according to the present embodiment is useful as an adhesive composition. In other words, the adhesive composition according to the present embodiment contains the curable composition described above.

In particular, the curable composition according to the present embodiment is preferably used for the adhesion of a porous material, as already described.

A speaker will be described below as an example of an article containing a cured substance of the curable composition according to the present embodiment.

FIG. 1 is a view (a cross-sectional view) schematically illustrating a configuration example of a speaker.

The curable composition according to the present embodiment is preferably used, for example, for the adhesion between a cone paper 1 and a dust cap paper 2. In FIG. 1, a cone paper 1 and a dust cap paper 2 are adhered by a cured substance 4A of a curable composition. That is, the curable composition according to the present embodiment is used for adhesion between porous materials.

In addition, the curable composition according to the present embodiment is used, for example, for the adhesion between the cone paper 1 and the voice coil 3 (generally, made of aluminum). In FIG. 1, the cone paper 1 and a voice coil 3 are adhered by a cured substance 4B of the curable composition. In other words, the curable composition according to the present embodiment is also preferably applicable to a use application for adhesion between a porous material and a metal material.

The curable composition according to the present embodiment is particularly preferably used for speaker manufacturing as described above. Although the details are unknown, it is conceived that since the dynamic viscoelasticity of the adhesive curable composition according to the present embodiment is as described above, the curable composition (cured substance) suitably absorbs the vibration of the cone paper 1, the dust cap paper 2, the voice coil 3, and the like. It is conceived that in a case of manufacturing a speaker using the curable composition according to the present embodiment, it is possible to enhance the sound quality of the speaker and extend the life span of the speaker.

<Checking Method>

In a case where the curable composition according to the present embodiment contains the fluorescent agent (C), it is possible to check a state of being coated with the curable composition by irradiating an adherend that is coated with the curable composition with ultraviolet rays.

For example, in a case of irradiating a curable composition or an adherend coated with a curable composition with ultraviolet rays, the curable composition becomes visible, and the state of being coated such as the coating position and coating amount can be checked. In addition, the fluorescence emitted from a curable composition containing a fluorescent agent can be checked visually or with a camera, and the fluorescence can be subjected to image processing to determine whether or not the coating with the curable composition has been carried out.

The embodiments according to the present invention have been described above; however, these are examples according to the present invention, and thus it is possible to adopt various configurations other than the above. In addition, the present invention is not limited to the embodiments described above and modifications, improvements, and the like are included in the present invention in a range in which it is possible to achieve the purpose of the present invention.

EXAMPLES

The executive aspect according to the present invention will be described in more detail based on Examples and Comparative Examples. It should be noted that the present invention is not limited to only Examples.

<Preparation of Curable Composition>

Each of the components shown in the table below was uniformly mixed according to the amount ratio (unit:part by mass) shown in the table to prepare a curable composition.

The curable compositions of Example 1 and Comparative Example 1 were prepared as a two-agent type of the first agent and the second agent. The curable compositions of other Examples were prepared as the one-agent type.

Details about some of the components will be described as follows.

TE-2000 (manufactured by NIPPON SODA Co., Ltd.): urethane methacrylate. The polyol compound is a 1,2-polybutadiene polyol, which is a polybutadiene polyol. The organic polyisocyanate compound is tolylene diisocyanate. Hydroxy (meth)acrylate is 2-hydroxyethyl methacrylate. Number average molecular weight: 2,500.

TEAI-1000 (manufactured by NIPPON SODA Co., Ltd.): urethane acrylate. The polyol compound is a hydrogenated 1,2-polybutadiene polyol, which is a polybutadiene polyol. The organic polyisocyanate compound is tolylene diisocyanate. Hydroxy (meth)acrylate is 2-hydroxyethyl acrylate. Number average molecular weight: 2,000.

UC-102M (manufactured by KURARAY Co., Ltd.): an esterified product oligomer between a maleic acid anhydride adduct of an isoprene polymerized substance and 2-hydroxyethyl (meth)acrylate. In Formula (1), Y is an ethylene group, and R is a methyl group. Number average molecular weight: 17,000.

MU3603 (manufactured by MIWON Specialty Chemical Co., Ltd.): urethane acrylate. Number average molecular weight: 3,300.

Hakkol P (manufactured by Showa Chemical Industry Co., Ltd.): a coumarin derivative.

<Dynamic Viscoelasticity Measurement>

First, a cured substance (a test piece) of the curable composition was prepared for the dynamic viscoelasticity measurement. Specifically, a test piece was prepared as described in (1) to (3) below.

(1) The surface of a PET film to form a coating film was coated with a curable composition (a curable composition obtained by mixing two agents in a case of a two-agent type curable composition) that could be blended as described in the table below. It is noted that a 0.5 mm-thick tape was attached in advance as a spacer to a part of the surface of the PET film in order to adjust the film thickness of the cured substance.

(2) Another PET film was bonded on the coating film. Then, both surfaces were sandwiched between glass plates having a thickness of 1 cm and pressed by putting a weight thereon. In this state, aging was carried out for 24 hours in a room with a temperature of 23° C. and a relative humidity of 50 RH %. Thereafter, the pressure was released, and the PET film was peeled off. In this way, a sheet-shaped cured substance having a thickness of 0.5 mm was obtained.

(3) The sheet-shaped cured substance was cut to obtain a strip-shaped test piece of 0.5×5×40 mm.

Using a dynamic viscoelasticity measuring device (DMS7100, manufactured by SII NanoTechnology Inc.), the dynamic viscoelastic properties of the obtained test piece were measured, and data were obtained under the conditions of frequency: 1.0 Hz, mode: tensile mode, measurement temperature range: −50° C. to 200° C., and temperature rising rate: 2° C./min. Based on the obtained data, the half width of the temperature-loss tangent (tan δ) graph, the storage elastic modulus E' at the peak top temperature of the loss tangent (tan δ), and the like were determined.

<Evaluation of Adhesion of Porous Material: Peel Strength Between Metal and Canvas>

First, a sample for peel strength measurement was prepared as follows.

Specifically, one side of one test piece (SPCC of 100 mm×25 mm×5 mm, acetone degreasing-treated) was coated with a curable composition (a curable composition obtained by mixing two agents in a case of a two-agent type curable composition) in a region of 80 mm×25 mm.

Immediately thereafter, a canvas was superimposed and bonded on a portion coated with the curable composition, followed by fixing with a clip. Then, aging was carried out at room temperature (23° C.) for 24 hours. In this way, a sample for peel strength measurement was obtained. At this time, the following canvas was used.

[Canvas Used]

Product name: Canvas Aging No. 9 ("No. 9" means the standard specified in the old JIS L 3102)

Dimensions: Height 200 mm×side (width) 25 mm×thickness 0.7 mm

Material: Cotton

Presence or absence of water repellency treatment: Absent

Purchased from: MARUHON INC.

The peel strength was measured by 180° peeling according to JIS K 6854-2:1999 under an environment of 23° C. temperature and 50% humidity. At this time, the tensile speed was set to 50 mm/min, and an all-purpose testing machine "Model 5569" manufactured by Instron was used as a device.

From the obtained peel chart, the average peeling force (N) was determined from the force-grasp moving distance curve over a peel length of a length of at least 100 mm excluding the first 25 mm. This average peeling force (N) was divided by the test piece width of 25 mm to calculate the 180° peel strength.

<Evaluation of Adhesion Between Metals>

An evaluation was carried out according to JIS K 6850.

Specifically, one side of one test piece (SPCC of 100×25×5 mm, subjected to acetone degreasing treatment after sandblasting treatment) was coated with a curable composition (a curable composition obtained by mixing two agents in a case of a two-agent type curable composition) and then immediately superimposed and bonded to the other test piece (SPCC of 100×25×5 mm). Thereafter, aging was carried out at room temperature (23° C.) for 24 hours. In this way, a sample for tensile shear adhesion strength measurement was obtained. It is noted that in order to make the thickness of the curable composition layer uniform, a trace amount of glass beads having a particle diameter of 100 μm was added to the curable composition.

Tensile shear adhesion strength was measured in an environment of 23° C. and 50% humidity at a tensile speed of 10 mm/min using an all-purpose testing machine "Model 5569" manufactured by Instron.

<Curing Time (Time Taken Until Adhesion Force is Exhibited>

A test piece (a sample for tensile shear adhesion strength measurement) was prepared by bonding two sheets of SPCC in the same manner as in <Evaluation of adhesion between metals> described above, except that the aging of 24 hours at room temperature (23° C.) was not carried out. A plurality of test pieces was prepared for the following plurality of times of test.

The tensile shear adhesion strength of the test piece aged at room temperature (23° C.) for a predetermined period of time after the preparation was measured. The time taken until the strength of 0.1 MPa or more was exhibited was determined by setting the time at which the bonding had been carried out as a reference (0 minutes).

Various kinds of information are summarized in the table below.

TABLE 1

| Classification | Chemical name | Product name (manufacture/ supplier) | Example 1 First agent | Example 1 Second agent | Comparative Example 1 First agent | Comparative Example 1 Second agent | Example 2 | Example 3 | Example 4 | Example 5 | Example 6 | Comparative Example 2 |
|---|---|---|---|---|---|---|---|---|---|---|---|---|
| Polymerizable compound | 1, 2-polybutadiene dimethacrylate | TE-2000 (NIPPON SODA CO., Ltd.) | 59 | 55 | | | 60 | | | 85 | 50 | |
| | Hydrogenated 1, 2-polybutadiene diacrylate | TEAI-1000 (NIPPON SODA (Cc., Ltd.) | | | | | | 60 | | | | |
| | Methacrylic modified polyisoprene | UC-102M (KURARAY Co. , Ltd.) | | | | | | | 60 | | | |
| | Urethane acrylate | MU3603 {MIWON Specialty Chemical Co., Ltd.) | | | | | | | | | | 60 |
| | Methyl methacrylate | MMA (Mitsubishi Chemical Corporation) | 2 | 11 | 30 | 30 | 7 | 7 | 7 | 2 | 10 | 7 |
| | 2-hydroxyethyl acrylate | HEMA (Nippon Shokubai Co., Ltd. ) | 39 | 12 | 40 | 40 | 27 | 27 | 27 | 10 | 30 | 27 |
| | Trimethylolpropane trimethacrylate | TMPT-M (SHIN-NAKAMURA CHEMICAL Co., Ltd. ) | 6 | 12 | 20 | 20 | 6 | 6 | 6 | 3 | 10 | 6 |
| | Isobornyl methacrylate | IB-X (Kyoeisha Chemical Co., Ltd. ) | | | 10 | 10 | | | | | | |
| Polymerization initiator | Cumene hydroperoxide | PERCUMYL H-80 (NOF Corporation) | 1.2 | | 5 | | 1.2 | 1.2 | 1.2 | 1.2 | 1.2 | 1.2 |
| Fluorescent agent | Fluorescent brightening agent | Hakkol P (Showa Chemical Industry Co., Ltd. ) | | 0.02 | | 0.01 | 0.02 | 0.02 | 0.02 | 0.02 | 0.02 | 0.02 |
| Reducing agent | N, N-di (2-hydroxyethyl )-p-toluidine | PT-2HE ( MORIN Chemical Industries Co., Ltd. ) | 1 | | | | 1 | 1 | 1 | 1 | 1 | 1 |
| | Cobalt octylate | CO-12E (Tokyo Fine Chemical Co., Ltd. ) | | 2.5 | | | 2.5 | 2.5 | 2.5 | 2.5 | 2.5 | 2.5 |
| | Ethylene thiourea | ACCEL 22-S (Kawaguchi Chemical Industry Co., Ltd. ) | | | | 0.8 | | | | | | |
| | Copper naphthenate | Naphtex Copper (Nippon chemical Industrial Co., Ltd.) | | | | 0.2 | | | | | | |
| Paraffin | Paraffin wax | Paraffin Wax 115 (NIPPON SEIRO Co., Ltd. ) | 1 | 1 | 1 | 1 | | | | | | |
| Others | Acrylonitrile-butadiene rubber | DN-612P (Zeon Corporation) | | | 3 | 3 | | | | | | |
| | Methyl methacrylate-butadiene-styrene copolymer | BL-20 (Denka Company Limited) | | | 17 | 17 | | | | | | |
| Half width of temperature-loss tangent (tan 8) graph | | | 106° C. | | 81° C. | | 113° C. | 98° C. | 144° C. | 102° C. | 97° C. | 68° C. |
| Storage elastic modulus E' at peak top temperature of loss tangent (tan 8) /Pa | | | $7 \times 10^7$ | | $2 \times 10^7$ | | $8 \times 10^7$ | $5 \times 10^7$ | $1 \times 10^7$ | $5 \times 10^7$ | $5 \times 10^7$ | $7 \times 10^7$ |
| Reference: peak top temperature of loss tangent (tan 8) | | | 116° C. | | 130° C. | | 119° C. | 74° C. | 103° C. | 112° C. | 120° C. | 56° C. |
| Evaluation of adhesion of porous material: 180° peel strength between metal and canvas (SPCC - canvas) /kN/m | | | 2.9 | | 0.1 | | 3.1 | 2.8 | 2.1 | 2.9 | 3.0 | 1.2 |
| Evaluation of adhesion between metals: tensile shear adhesion strength between metal and canvas {SPCC - SPCC) /MPa | | | 14.8 | | 15.1 | | 15.3 | 15.1 | 13.3 | 15.1 | 14.6 | 11.8 |
| Curing time (time taken until adhesion force is exhibited) /min | | | 5.0 | | <1.0 | | 4 | 6 | 15 | 6.0 | 3.0 | 18 |

As shown in Table 1, in a case of using curable composition in which the half width of the temperature-loss tangent (tan δ) graph is 90° C. or higher and 150° C. or less, it is possible to adhere a porous material to a metal with high strength. On the other hand, in a case of using the curable composition of Comparative Example 1, in which the half width of the temperature-loss tangent (tan δ) graph is less than 90° C., it is not possible to satisfactorily adhere a porous material to a metal.

Looking at Examples in more detail, it can be understood that from the comparison between Example 4 and the other Examples, the larger the storage elastic modulus E' at the peak top temperature of the loss tangent (tan δ) is, the larger adhesion force is obtained.

In a case where the composition according to the present embodiment is applied to the adhesion of a porous material, the adhesiveness such as adhesion strength is excellent as compared with that of Patent Document 1.

As a result of coating an adherend with each of the curable compositions of Examples 1 to 5, the state of coating of the adherend with the curable composition could be easily checked. This is because the curable composition contains a fluorescent agent.

This application claims priority based on Japanese Patent Application No. 2020-181256 filed on Oct. 29, 2020, and all contents of the disclosure are incorporated herein.

REFERENCE SIGNS LIST

1 cone paper
2 dust cap paper
3 voice coil
4A cured substance of curable composition
4B cured substance of curable composition

The invention claimed is:

1. A curable composition comprising:
a polymerizable compound (A); and
a polymerization initiator (B),
wherein the polymerizable compound (A) includes a compound (a1) having a (meth)acryloyl group and having a diene-based or hydrogenated diene-based skeleton,
wherein a content ratio of the compound (a1) in the entire polymerizable compound (A) is 40% by mass or more and 90% by mass or less,
wherein a half width of a temperature-loss tangent (tan δ) graph, which is obtained by measuring a dynamic viscoelasticity of a cured substance of the curable composition under the following measurement conditions, is 90° C. or higher and 150° C. or lower,
[measurement conditions]
Frequency: 1.0 Hz
Mode: tensile mode
Measurement temperature range: −50° C. to 200° C.
Temperature rising rate: 2° C./min and
wherein in the dynamic viscoelasticity measurement, a storage elastic modulus E' at a peak top temperature of the loss tangent (tan δ) is $3\times10^7$ Pa or more.

2. The curable composition according to claim 1,
wherein the polymerizable compound (A) includes a further compound having a (meth)acryloyl group.

3. The curable composition according to claim 1,
wherein a content ratio of the compound (a1) in the entire polymerizable compound (A) is 50% by mass or more and 90% by mass or less.

4. The curable composition according to claim 1,
wherein the polymerizable compound (A) further includes, as a component different from the compound (a1), one or two or more polymerizable compounds selected from the group consisting of a monofunctional (meth)acrylate (a2), a polyfunctional (meth)acrylate (a3), and a hydroxyl group-containing (meth)acrylate (a4).

5. The curable composition according to claim 1,
wherein a 180° peel strength is 1 kN/m or more in a test piece which is obtained by adhering a cold-rolled steel plate to a canvas having a width of 25 mm at 23° C. using the curable composition.

6. The curable composition according to claim 1, further comprising:
a fluorescent agent (C).

7. The curable composition according to claim 1,
wherein in a tensile shear adhesion test, time taken until a strength of 0.1 MPa is exhibited is 2 minutes or more and less than 1 hour in a test piece which is obtained by adhering cold-rolled steel plates to each other at 23° C. using the curable composition.

8. The curable composition according to claim 1,
wherein the curable composition is used in adhering porous materials to each other.

9. The curable composition according to claim 1,
wherein the curable composition is used in adhering a porous material to a metal material.

10. An article comprising:
a cured substance of the curable composition according to claim 1.

11. A checking method for checking a state of being coated with a composition, comprising:
irradiating an adherend that is coated with the curable composition according to claim 6 with ultraviolet rays; and
checking the fluorescence emitted from the curable composition containing the fluorescent agent (C).

12. An adhesive composition comprising:
the curable composition according to claim 1.

13. A curable composition comprising:
a polymerizable compound (A),
a polymerization initiator (B); and
a fluorescent agent (C),
wherein the polymerizable compound (A) includes a compound (a1) having a (meth)acryloyl group and having a diene-based or hydrogenated diene-based skeleton,
wherein a content ratio of the compound (a1) in the entire polymerizable compound (A) is 40% by mass or more and 90% by mass or less,
wherein a half width of a temperature-loss tangent (tan δ) graph, which is obtained by measuring a dynamic viscoelasticity of a cured substance of the curable composition under the following measurement conditions, is 90° C. or higher and 150° C. or lower,
[measurement conditions]
Frequency: 1.0 Hz
Mode: tensile mode
Measurement temperature range: −50° C. to 200° C.
Temperature rising rate: 2° C./min.

14. A curable composition comprising:
a polymerizable compound (A); and
a polymerization initiator (B),
wherein the polymerizable compound (A) includes a compound (a1) having a (meth)acryloyl group and having a diene-based or hydrogenated diene-based skeleton, wherein a content ratio of the compound (a1) in the entire polymerizable compound (A) is 40% by mass or more and 90% by mass or less, wherein the polymerizable compound (A) further contains a monofunctional (meth)acrylate (a2) as a component different from the compound (a1), wherein the monofunctional (meth)acrylate (a2) includes methyl (meth)acrylate, wherein a half width of a temperature-loss tangent (tan δ) graph, which is obtained by measuring a dynamic viscoelasticity of a cured substance of the curable composition under the following measurement conditions, is 90° C. or higher and 150° C. or lower,

[measurement conditions]

Frequency: 1.0 Hz

Mode: tensile mode

Measurement temperature range: −50° C. to 200° C.

Temperature rising rate: 2° C./min.

* * * * *